(12) United States Patent
Keronen

(10) Patent No.: US 6,871,277 B1
(45) Date of Patent: Mar. 22, 2005

(54) APPARATUS AND METHOD FOR PREVENTING DISCLOSURE OF PROTECTED INFORMATION

(75) Inventor: Seppo Reino Keronen, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,108

(22) Filed: Oct. 20, 1999

(30) Foreign Application Priority Data

Oct. 20, 1998 (AU) ............................................. PP6602

(51) Int. Cl.⁷ ............................................. H04L 9/00
(52) U.S. Cl. ........................ 713/167; 713/166; 713/165; 713/201; 713/200
(58) Field of Search ................. 713/201, 200, 713/175, 165, 166, 167

(56) References Cited

U.S. PATENT DOCUMENTS

| | | | | |
|---|---|---|---|---|
| 4,713,753 A | * | 12/1987 | Boebert et al. | 711/164 |
| 4,984,272 A | * | 1/1991 | McIlroy et al. | 713/200 |
| 5,204,961 A | * | 4/1993 | Barlow | 713/201 |
| 5,421,006 A | | 5/1995 | Jablon et al. | 395/575 |
| 5,590,266 A | * | 12/1996 | Carson et al. | 345/741 |
| 5,619,657 A | * | 4/1997 | Sudama et al. | 709/225 |
| 5,675,510 A | | 10/1997 | Coffey et al. | 364/514 A |
| 5,991,877 A | * | 11/1999 | Luckenbaugh | 713/200 |
| 6,023,765 A | * | 2/2000 | Kuhn | 713/200 |
| 6,289,462 B1 | * | 9/2001 | McNabb et al. | 713/201 |
| 6,292,900 B1 | * | 9/2001 | Ngo et al. | 713/200 |
| 6,304,973 B1 | * | 10/2001 | Williams | 713/201 |
| 6,601,171 B1 | * | 7/2003 | Carter et al. | 713/175 |

OTHER PUBLICATIONS

Reagle, J., et al., P3P Architecture Working Group, General Overview of the P3P Architecture, W3C Working Draft, Oct. 22, 1997.

Ackerman, M., et al., P3P Vocabulary Working Group, Grammatical Model and Design Model, W3C Working Draft, Oct. 14, 1997.

* cited by examiner

*Primary Examiner*—Norman M. Wright
(74) *Attorney, Agent, or Firm*—Fitzpatrick, Cella, Harper & Scinto

(57) ABSTRACT

The method prevents disclosure of protected information in a platform. The platform includes a plurality of entities (204) and a security manager (104). Each entity (204) has data which indicates whether the entity is trusted or untrusted and whether the entity has or has not been exposed to protected information. The untrusted entity (500) requests (504) an unsafe operation of a trusted entity (502). The trusted entity (502) notifies the security manager (104) of the requested operation. The trusted entity (502) then halts the requested operation if the untrusted entity (500) contains protected information or has been exposed to protected information.

39 Claims, 8 Drawing Sheets

APPARATUS AND METHOD FOR PREVENTING DISCLOSURE OF PROTECTED INFORMATION

FIELD OF INVENTION

The present invention relates to an apparatus and method for preventing disclosure of protected information on a platform. The present invention also relates to a method and apparatus for marking an entity as having been exposed to protected information. The invention also relates to a computer readable medium comprising a computer program for preventing disclosure of protected information, for preventing disclosure of protected information on a platform and/or for marking an entity as having been exposed to protected information.

BACKGROUND TO THE INVENTION

Confidential and other sensitive information is increasingly stored and processed on computer systems. It is common for these computer systems to be nowadays connected to communication networks. There is a danger that programs executing on computer systems that contain confidential and sensitive information will either deliberately or inadvertently, reveal the information to outside parties.

The publications "General Overview of the P3P Architecture" and "Grammatical Model and Data Design Model" (hereinafter referred to as the P3P publications) disclose the model drafts of the platform for privacy preferences project. A copy of these publications may be found on the Australian priority document; Patent Application No. PP6602. These P3P publications were obtained on the website HTTP:\\www.w3.org\TR\WD-P3P-ARCH.HTML on the 19 May 1998. The P3P publications disclose a model for privacy conversations between a user agent and a service. The model enables sides to express privacy practices and for the user to express their preferences about those practices and have their agent act on it accordingly. The user agent can then provide the user a safe and seamless interaction. The P3P publications disclose a P3P interaction as resulting in an agreement between the service and the user agent regarding the practices associated with a user's implicit or explicit data. The agreement may comprise service side permissions regarding the storage and release of data written by the service and accepted by the user agent. However this privacy protection model is implemented on a remote computer system and the user will have to trust the other computer system to keep the information confidential.

SUMMARY OF THE INVENTION

It is an object of the present invention to ameliorate one or more disadvantages of the prior art.

According to one aspect of the invention, there is provided a method of preventing disclosure of protected information in a platform, wherein the platform comprises a plurality of entities and a security manager, each entity having data indicating whether the entity is trusted or untrusted and whether the entity has or has not been exposed to the protected information, wherein said method comprises the steps of: (i) requesting an unsafe operation of a trusted first said entity by a second said entity; (ii) notifying the security manager of the requested operation; and (iii) halting the requested operation of the trusted first entity, if the second entity is untrusted and contains protected information or has been exposed to protected information.

According to another aspect of the invention, there is provided a method of marking an entity as having been exposed to protected information in a platform, wherein the platform comprises a plurality of entities, each entity having data indicating whether the entity is trusted or untrusted and whether the entity has or has not been exposed to the protected information, wherein said method comprises the steps of: (i) requesting information from a first said entity by an untrusted second said entity; (ii) marking the data of the untrusted second entity to indicate that the untrusted second entity has been exposed, if the first entity contains protected information or has been exposed to protected information; and (iii) supplying the requested information from the first entity to the untrusted second entity.

According to another aspect of the invention, there is provided apparatus for preventing disclosure of protected information in a platform, wherein the platform comprises a plurality of entities and a security manager, each entity having data indicating whether the entity is trusted or untrusted and whether the entity has or has not been exposed to the protected information, wherein said apparatus comprises: request means for requesting an unsafe operation of a trusted first said entity by a second said entity; first notification means for notifying the security manager of the requested operation; and halting means for halting the requested operation of the trusted first entity, if the second entity is untrusted and contains protected information or has been exposed to protected information.

According to another aspect of the invention, there is provided apparatus for marking an entity as having been exposed to protected information in a platform, wherein the platform comprises a plurality of entities, each entity having data indicating whether the entity is trusted or untrusted and whether the entity has or has not been exposed to the protected information, wherein said apparatus comprises: request means for requesting information from a first said entity by an untrusted second said entity; marking means for marking the data of the untrusted second entity to indicate that the untrusted second entity has been exposed, if the first entity contains protected information or has been exposed to protected information; and supply means for supplying the requested information from the first entity to the untrusted second entity.

According to another aspect of the invention, there is provided a computer readable medium comprising a computer program for preventing disclosure of protected information, wherein the computer program comprises a first entity, wherein said first entity comprises data indicating whether the entity is trusted or untrusted and whether the entity has or not been exposed to the protected information, and said first entity comprises: request means for requesting an unsafe operation from a trusted second said entity; first notification means for notifying a security manager of the requested operation; and halting means for halting the requested operation of said trusted second entity, if the first entity is untrusted and contains protected information or has been exposed to protected information.

According to another aspect of the invention, there is provided a computer readable medium comprising a computer program for preventing disclosure of protected information, wherein the computer program comprises a security manager comprising: means for receiving a request by a first entity to perform an unsafe operation from a trusted second entity, wherein said first and second entities comprise data indicating whether the entity is trusted or untrusted and whether the entity has or has not been exposed to the protected information; and notification means for notifying the first entity that the request is refused, if the first entity is untrusted and contains protected information or has been exposed to protected information.

According to another aspect of the invention, there is provided a computer readable medium comprising a computer program for marking an entity as having been exposed to protected information, wherein the computer program comprises a first entity, herein said entity comprises data indicating whether the entity is trusted or untrusted and whether the entity has or not been exposed to the protected information, and wherein the first entity comprises request means for requesting information from an untrusted second said entity; marking means for marking the data of the first entity to indicate that the first entity has been exposed, if the untrusted second entity contains protected information or has been exposed to protected information; and receiving means for receiving the requested information from the second entity.

According to another aspect of the invention, there is provided a computer readable medium comprising a computer program for marking an entity as having been exposed to protected information, wherein the computer program comprises a security manager comprising: receiving means for receiving requests by an untrusted first entity for information from a second entity, wherein each said entity has data indicating whether the entity is trusted or untrusted and whether the entity has or has not been exposed to the protected information; marking means for marking data of the first entity to indicate that the first entity has been exposed, if the second entity contains protected information or has been exposed to protected information; and permission means for permitting the supply of the requested information from the second entity to the untrusted first entity.

BRIEF DESCRIPTION OF THE DRAWINGS

Embodiments of the invention are described with reference to the drawings, in which.

DETAILED DESCRIPTION

Figure 1:
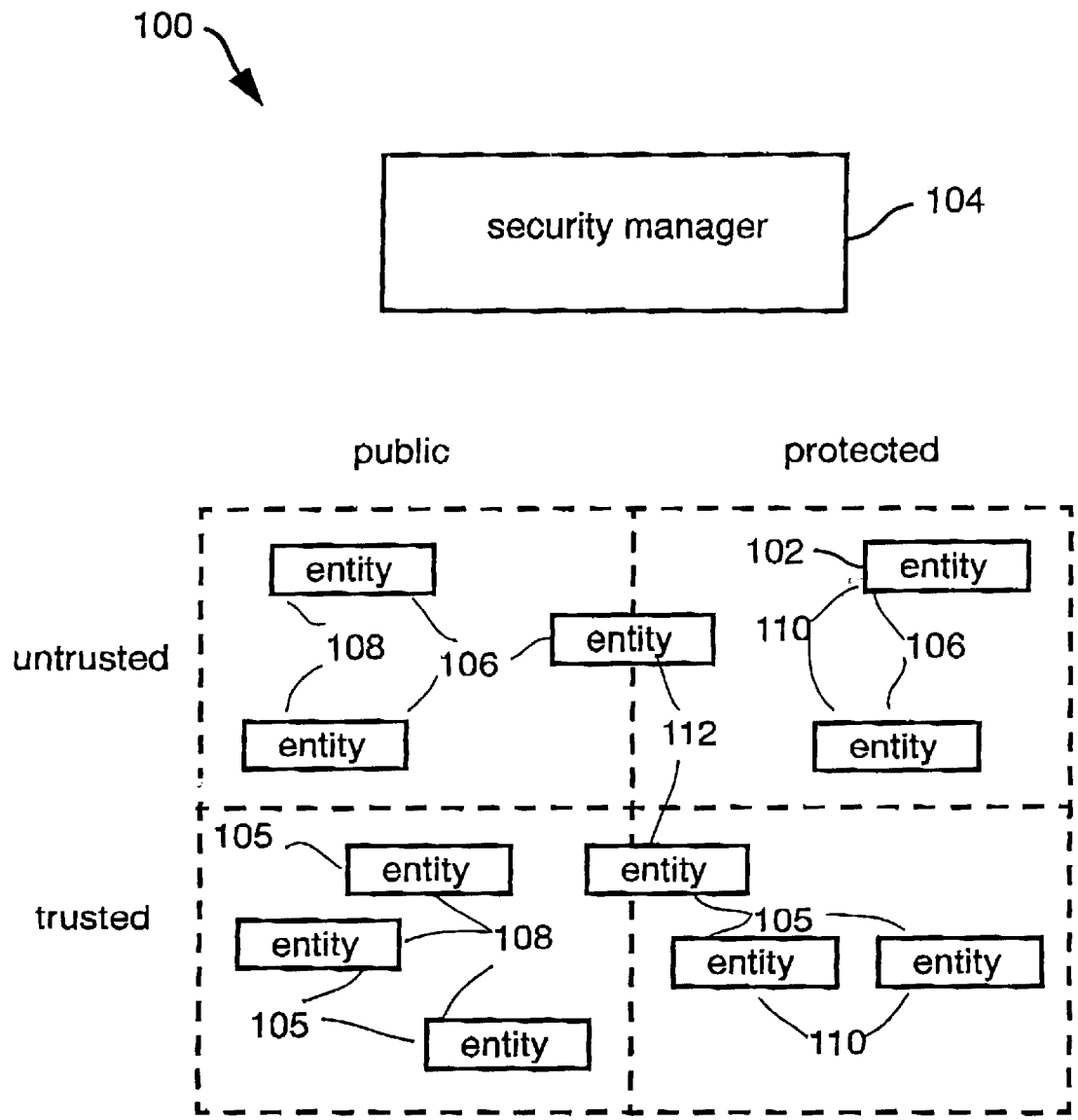
FIG. 1 shows the architecture of a platform for use in the methods of the preferred embodiments.

Where reference is made in any one or more of the accompanying drawings to steps and/or features, which have the same reference numerals, those steps and/or features have for the purposes of this description the same function (s) and/or operation(s), unless the contrary intention appears.

Before proceeding with a description of the preferred embodiment, a brief review of terminology used herein is discussed. The preferred method of preventing disclosure of protected information and of marking an untrusted entity as having been exposed to protected information, may be implemented on a general-purpose computer or any other appliance such as a domestic, service and industrial appliance that incorporates such a general-purpose computer. For example, the invention may be implemented in a digital telephone, a personal digital assistant, a video recorder, and so on. The platform may also comprise a network of computers, such as an intranet, in which case the communication of confidential information to a wider network, such as the internet, is to be prevented. The platform may also be realized as a virtual machine or software system, such as an internet browser or database system. The term platform is used herein to refer to any such computer, appliance, network, virtual machine or software system.

The term protected information used herein is taken to define any confidential information that is marked as not to be communicated outside the platform. Protected information may comprise personal or proprietary information and information made available under license, copyright or other contractual or informal agreement of non-disclosure or copy protection. The term an unsafe operation used herein is taken to define any operation, such as wireless or wire transmission, printing, writing on a removable storage medium, display on a monitor etc. that results in communication of the protected information outside the platform.
Preferred Embodiments of Method(s)

FIG. 1 shows the architecture of a platform on which a method of preventing disclosure of protected information and on which a method of marking an entity as having been exposed to protected information are implemented. The platform 100 comprises a plurality of components, called entities 102. The platform also comprises a security manager 104, which controls the security of the information on the platform 100.

As shown in FIG. 1, the entities 102 comprise either trusted 105 or untrusted entities 106. It is preferable that untrusted entities 106 be encapsulated as software entities. The entity encapsulation should prevent uncontrolled read and write operations outside the memory address base of the entities. This can be achieved by known hardware and software means, comprising memory management hardware and careful software language design, such as Java. It is not necessary that trusted entities be so encapsulated. However, for purposes of simplicity of description, the trusted entities described herein are encapsulated. The information encapsulated in the entities is classified as either protected or public. As shown in FIG. 1, an entity 102 may contain just public 108, just protected 110 or both public and protected information 112.

Figure 2A:
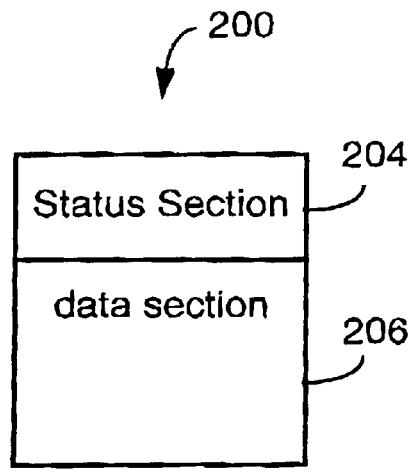
FIGS. 2A and 2B are block diagrams of two types of entities shown in FIG. 1.
Figure 2B:
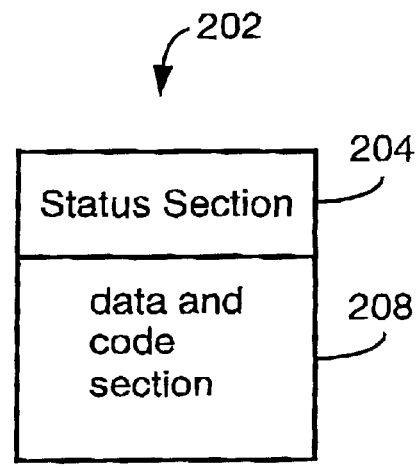

Turning now to FIGS. 2A and 2B, there is shown block diagrams of two types of such entities 102 disposed in the memory of the platform 100. The entity 102 may be either a passive entity 200 or an active entity 202. The passive entity 200 comprises a software or hardware entity that does not comprise executable instructions. Some examples of passive entities 200 are data files and machine registers containing data that is not interpreted as executable instructions. The active entity 202 comprises a software or hardware entity that contains some executable instructions. The active entity 202 can also contain non-executable data. Some examples of active entities are programs and active components. The passive entity 200 consists of two sections, a status section 204 and a data section 206. In similar manner, the active entity 202 consists of two sections, a status section 204 and a code and data section 208. The status section 204 of the passive entity 200 contains information concerning any disclosure of any protected information contained in the data section 206. Similarly, the status section 204 of the active entity 202 contains information on disclosure of any protected information contained in the data and code section 208. The entities 200, 204 communicate through well defined interfaces and these interfaces may be constructed by known methods comprising message passing operations.

Figure 3A:
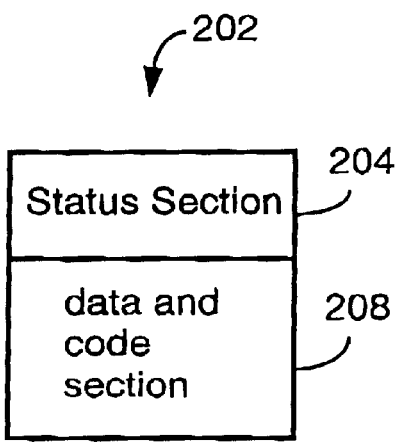
FIGS. 3A and 3B illustrate the internal structure of the entity shown in FIG. 1.
Figure 3B:
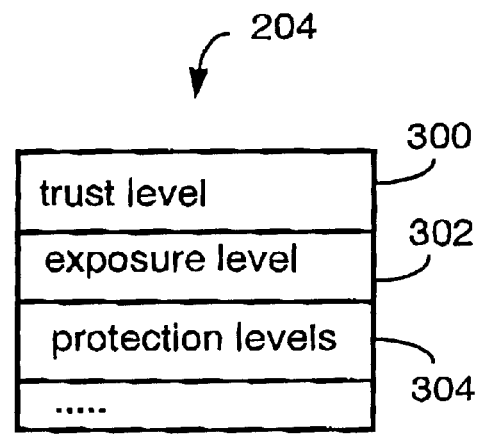

Turning now to FIGS. 3A and 3B, there is illustrated the internal structure of the entity 102 disposed in the memory of the platform 100. As mentioned above, the entity 102 consists of a status section 204 and a data section 206 or a code and data section 208. Untrusted entities, comprising the entity itself, are not able to change the contents of the status section 204. The status section 204 can only be updated by a trusted entity or a security manager application 104. The status section 204 contains three kinds of data fields; Trust level 300, exposure level 302 and protection level 304. The trust level 300 can have at least two values for marking the entity as either trusted or untrusted. The exposure level 302 has at least two values to indicate whether the entity is clean or has been exposed to protected information. The protection level 304 has at least two values public and protected. The protection levels indicate the sensitivity of information contained in the entity. Each protection level may refer to the entity as a whole or individual sensitive information that has been made available by the entity. An entity 102 whose status section 204 indicates that the entity is trusted may freely exchange information with other trusted entities. However, untrusted entities may only exchange data under certain restrictions. The exposure data field 302 applies to whether an untrusted entity has been exposed to protected data. Such an untrusted entity usually begins execution in a clean state until it becomes exposed to protected information.

Figure 4:
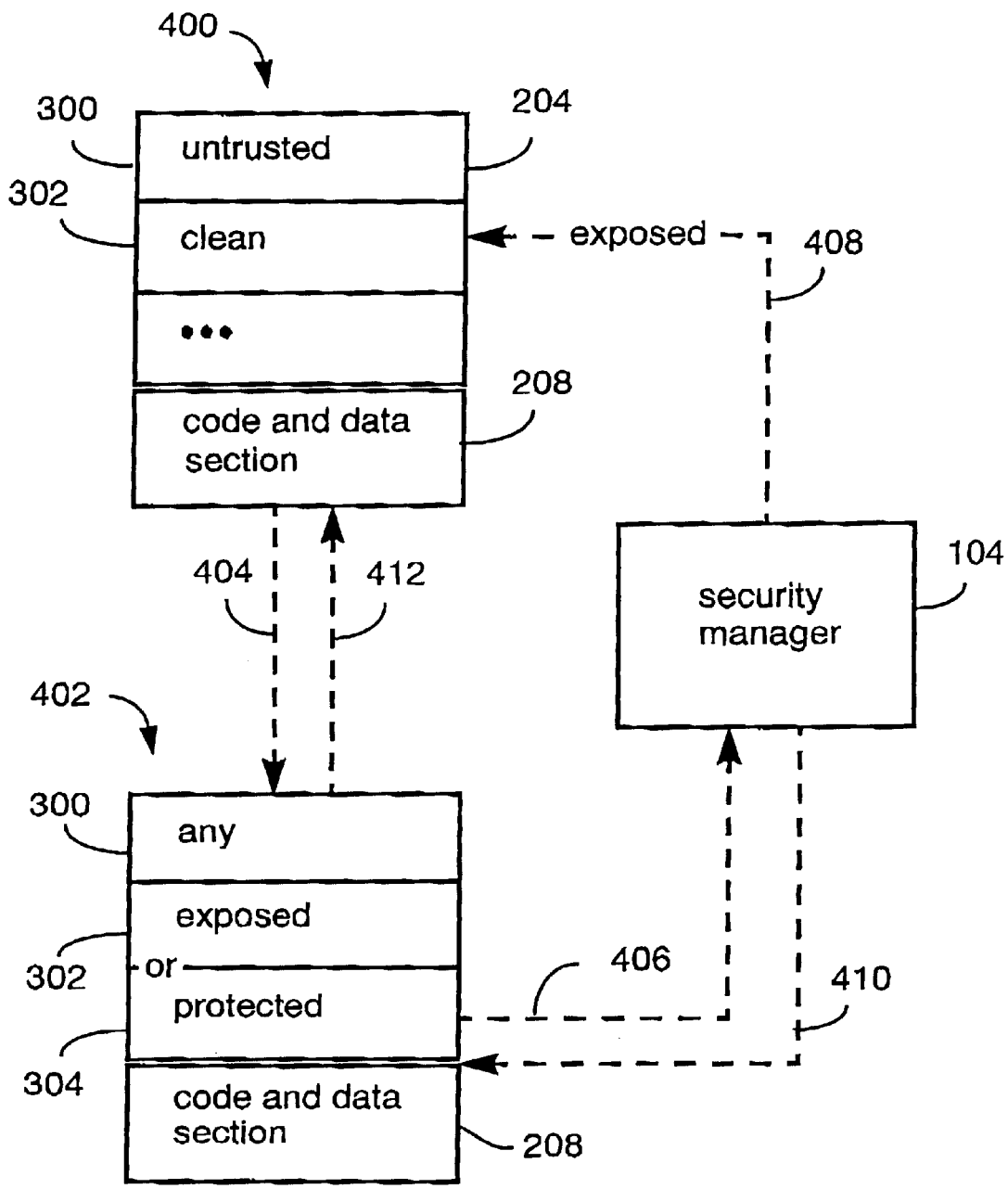
FIG. 4 illustrates a control flow diagram of a method of marking an untrusted entity as having been exposed to protected information, in accordance with a first preferred embodiment.

Turning now to FIG. 4, there is illustrated a control flow diagram of a method of marking an untrusted entity as having been exposed to protected information in accordance with a first preferred embodiment. In this embodiment, there is shown a platform having an untrusted active software entity 400 and an active software entity 402, which may be either trusted or untrusted. The data field 300 of the untrusted software entity 400 is set to untrusted and the exposure data field 302 is initially set to clean. The software entity 402 has its data field 300 set to untrusted or trusted, as the case may be, and its data fields 302 or 304 are set to exposed or protected. There is also shown a security manager application 104. In the first step 404 of the preferred method, the untrusted software entity 400 requests information from software entity 402. As can be seen from FIG. 4, the status section 204 of the software entity 400 indicates that the software entity is initially clean. In the next step 406, the software entity 402 determines whether said requested information is indicated in its status section 204 as being protected information or having been exposed to protected information. In these circumstances, software entity 402 notifies the security manager 104 and the execution of software entity 402 is halted. In the next step 408 of the method, the security manager 104 changes the exposure level 302 of software entity 400 from clean to exposed. In the next step 410, the security manager 104 then allows software entity 402 to continue execution. Finally in step 412, software entity 402 replies to software entity 400 and supplies the requested protected information. As a result of this method, the untrusted software entity 400 is now marked in its status section 204 as having been exposed to protected information. Any untrusted software entity which is marked as having been exposed to protected information is not able to communicate that information by performing any unsafe operation. An unsafe operation comprises any operation that actually discloses the protected information. It may comprise the communication of the protected information over the internet. It may also comprise the printing of the information on a printer. It could also comprise the display of the information on a monitor. Thus, untrusted software can be given access to protected information in order to provide a useful service without compromising the confidentiality of that protected information.

Figure 5:
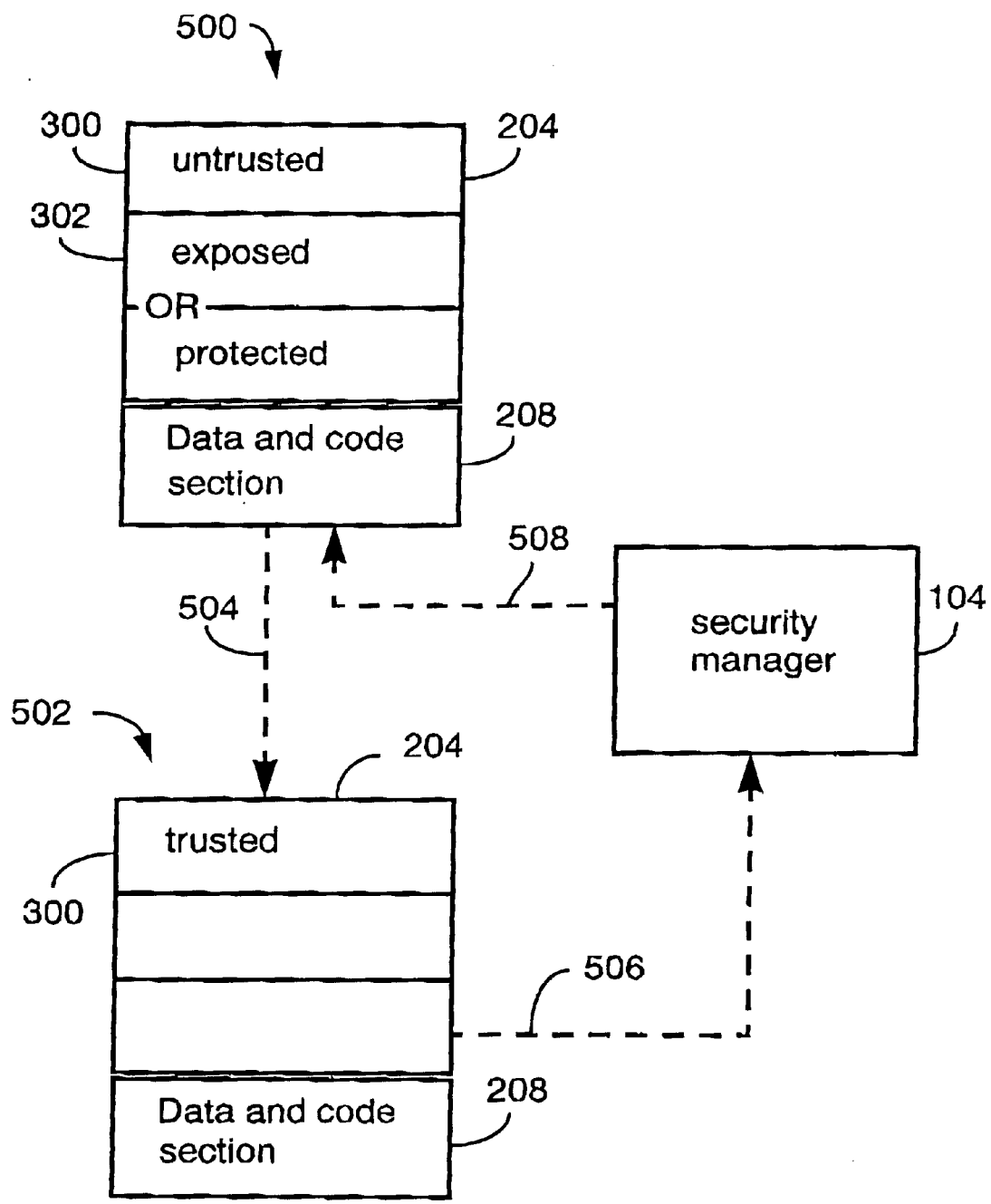
FIG. 5, illustrates a control flow diagram of a method of preventing disclosure of protected information on the platform, in accordance with a second preferred embodiment.

Turning now to FIG. 5, there is shown a control diagram of a method of preventing disclosure of protected information on the platform, in accordance with a second preferred embodiment. The platform 100 comprises an untrusted active software entity 500 whose status section 204 indicates that it has been exposed or contains protected information. The platform 100 also contains a trusted active software entity 502 and security manager 104. In the first step 504 of the second preferred method, the untrusted software entity 500 requests an unsafe operation from the trusted software entity 502. In the next step 506, the security manager application 104 is notified by software entity 502 that software entity 500 is untrusted and contains protected information or has been exposed to protected information and has requested an unsafe operation. Subsequently, software entity 502 halts its execution. In the next step 508, the security manager 104 then notifies the untrusted software entity 500 that the requested operation was not performed.

Figure 6:
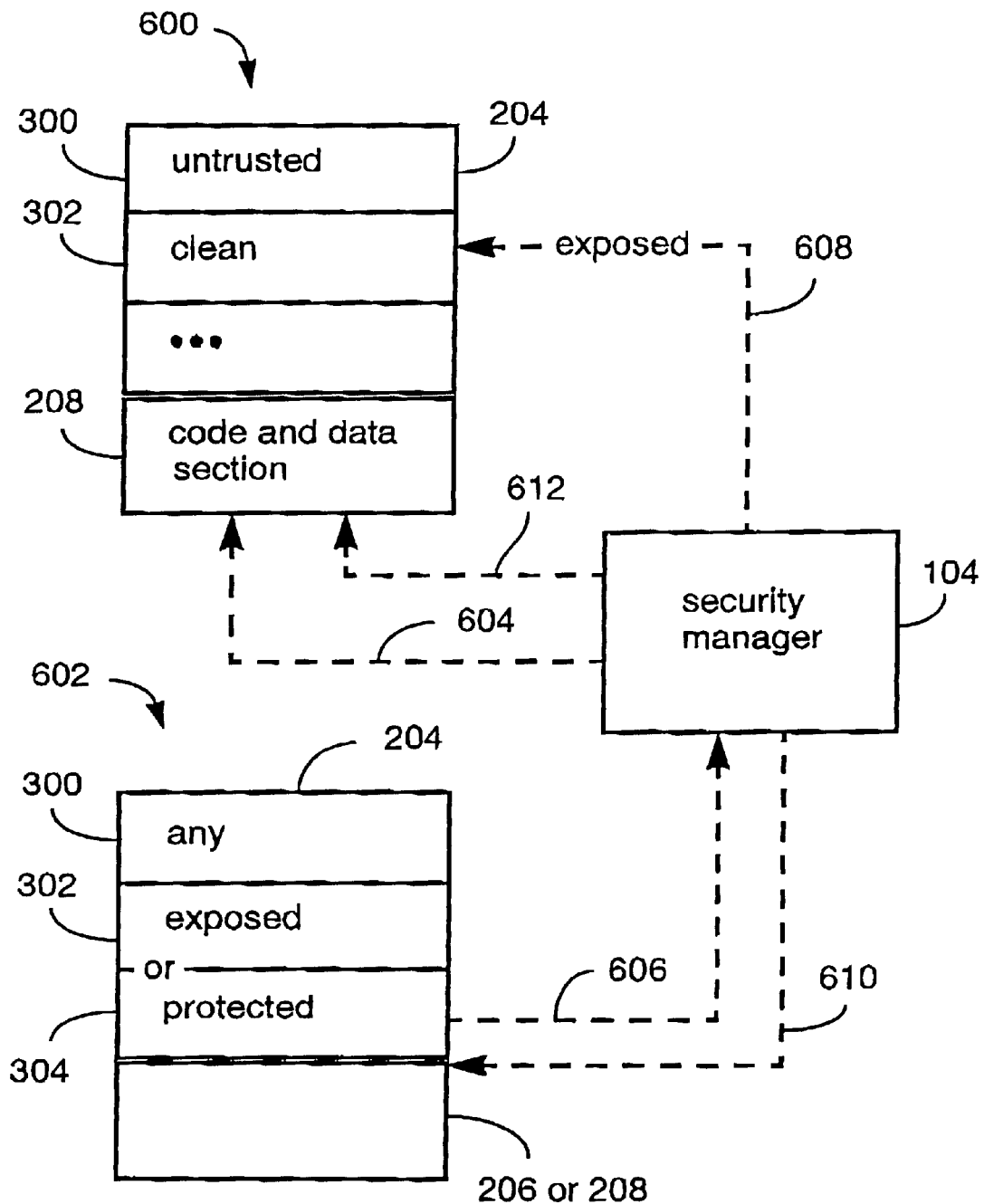
FIG. 6 illustrates a control flow diagram of a method of marking an entity as having been exposed to protected information as a result of a read operation, in accordance with a third preferred embodiment.

Turning now to FIG. 6, there is shown a control flow diagram of a method of marking an entity as having been exposed to protected information as a result of a read operation, in accordance with a third preferred embodiment. In this embodiment, there is shown a platform 100 having an active software entity 600 and a software entity 602, which may be either active or passive. The software entities 600 or 602 may either be trusted or untrusted. In this example, the exposure data field 302 of entity 600 is initially set to clean and its data field set to untrusted. The software entity 602 has its data field 300 set to untrusted or trusted, as the case may be, and its data fields 302 or 304 set to exposed or protected. There is also shown a security manager application 104. In the first step 604 of the method, the entity 600 requests to read information from entity 602. This request is supplied to the security manager application 104, which processes the request. In the next step 606, the security manager 104 determines whether the entity 602 contains protected or exposed information. If the entity 602 contains protected information or has been exposed to protected information, then the processing continues with step 608. Otherwise, the processing continues with step 610. In step 608, the security manager 104 marks the exposure data field 302 of entity 600 as being exposed. In step 610, the security manager 104 accesses the information in entity 602 and allows the supply of the information to entity 600 in step 612.

Figure 7:
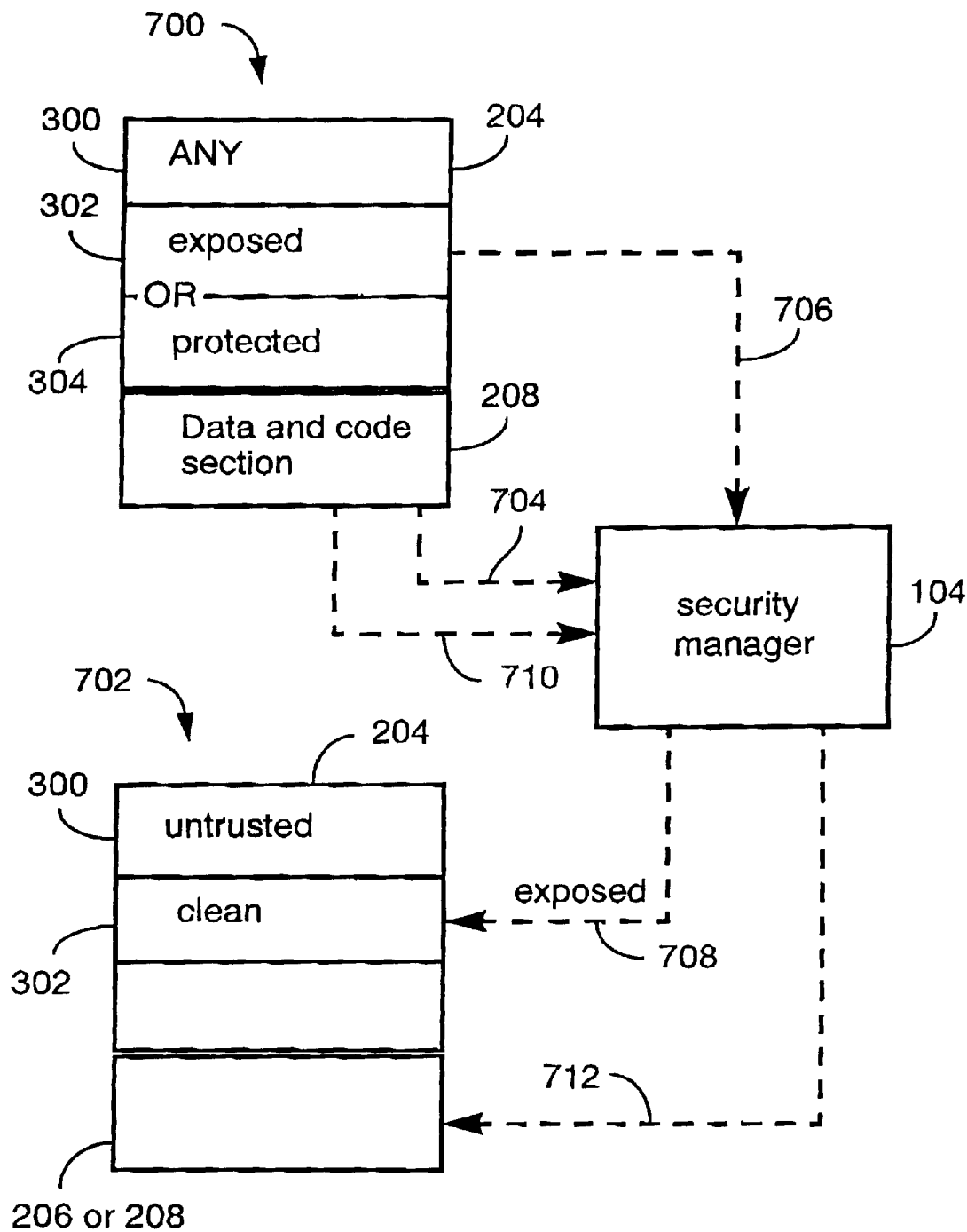
FIG. 7 illustrates a control flow diagram of a method of marking an entity as having been exposed to protected information as a result of a write operation, in accordance with a fourth preferred embodiment.

Turning now to FIG. 7, there is shown a control flow diagram of a method of marking an entity as having been exposed to protected information as a result of a write operation, in accordance with a fourth preferred embodiment. In this embodiment, there is shown a platform 100 having an active software entity 700 and a software entity 702, which may be either active or passive. The software entities 700 or 702 may be trusted or untrusted. In this example, the exposure data field 302 of entity 702 is initially set to clean and its data field 300 set to untrusted. The software entity 700 has its data field 300 set to untrusted or trusted, as the case may be, and its data fields 302 or 304 set to exposed or protected. There is also shown a security manager application 104. In the first step 704 of the method, the entity 700 requests to write information to entity 702. This request is sent to security manager 104, which processes the request. In the next step 706, the security manager determines whether the entity 700 contains protected information or has been exposed to protected information. If the entity 700 does contain protected information or has been exposed to protected information, the method continues to step 708. Otherwise, the processing continues to step 710. In step 708, the security manager 104 marks entity 702 as having been exposed to protected information. In step 710, the security manager accesses the information from entity 700 and writes 712 it to entity 702.

Figure 8:
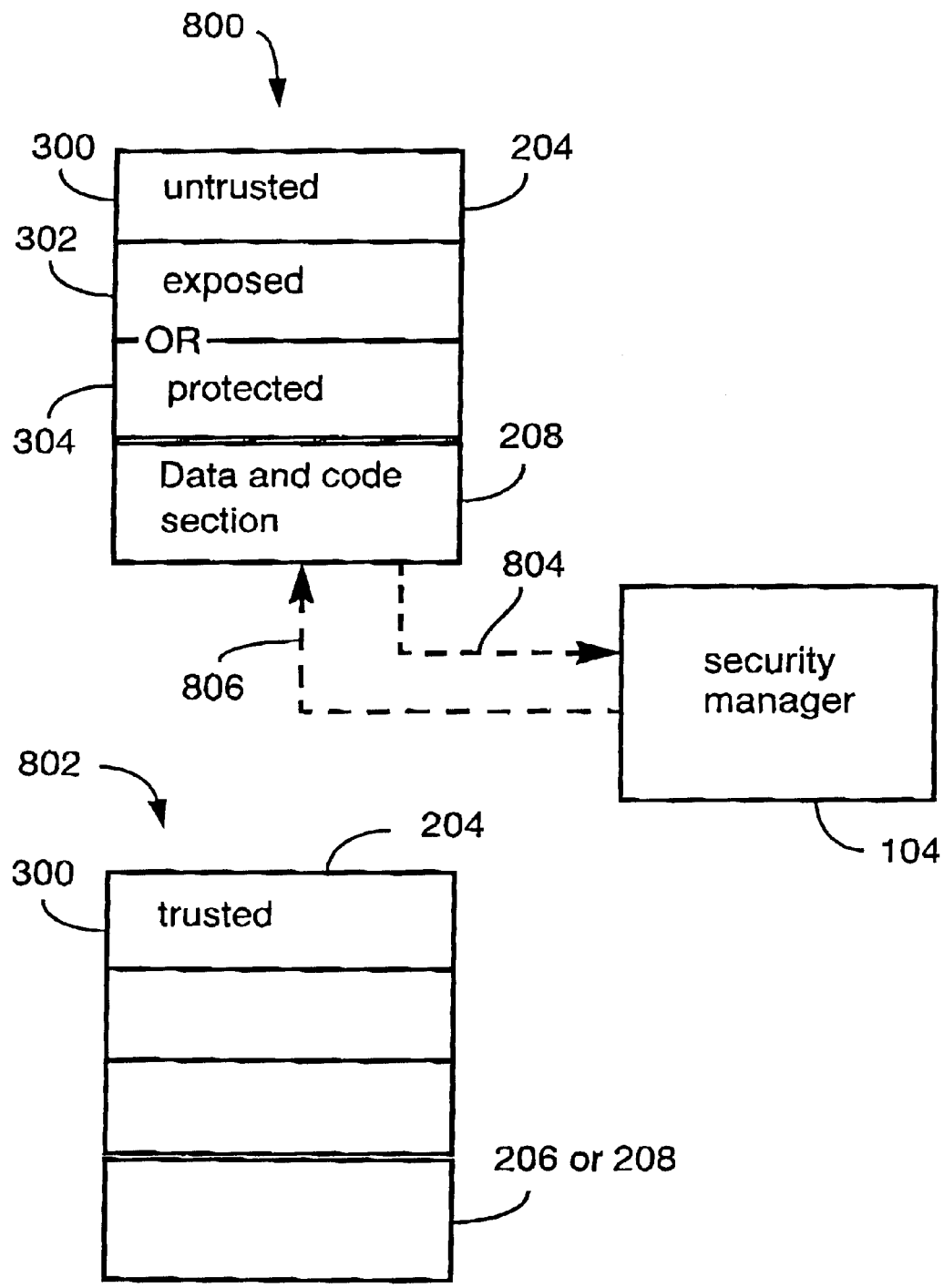
FIG. 8 illustrates a control flow diagram of a method of preventing disclosure of protected information on the platform, in accordance with a fifth preferred embodiment.

Turning now to FIG. 8, there is shown a control diagram of a method of preventing disclosure of protected information on the platform, in accordance with a fifth preferred embodiment. In this embodiment, there is shown a platform 100 having an untrusted active software entity 800 whose status section 204 indicates that it has been exposed or contains protected information. The platform 100 also contains a trusted software entity 802, which may be active or passive as the case may be. The platform 100 also contains a security manager 104. In the first step 804 of the fifth preferred method, the untrusted entity 800 requests an unsafe operation from trusted entity 802 via the security manager 104. In the next step 806, the security manager 104 determines whether entity 800 is untrusted and contains protected information or has been exposed to protected information. If so, the security manager 104 denies the requested unsafe operation and informs the untrusted entity 800 that the requested operation was not performed.

Preferred Embodiment of Apparatus(s)

Figure 9:
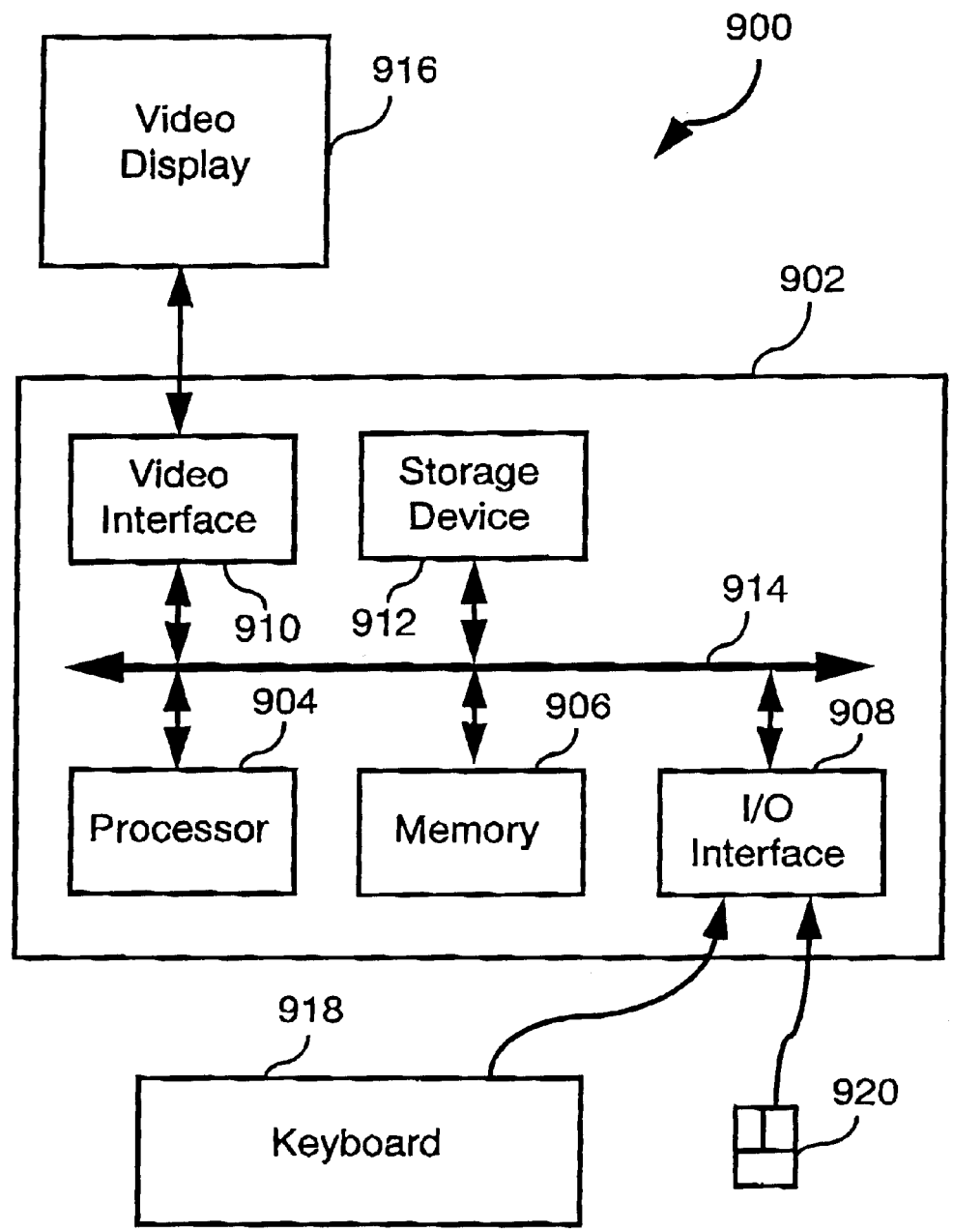
FIG. 9 shows in more detail a preferred example of such a platform shown in FIG. 1.

FIG. 9 shows in more detail a preferred example of such a platform shown in FIG. 1. The platform consists of a conventional general-purpose computer wherein the processes of FIGS. 2 to 8 may be implemented as software executing on the computer. In particular, the steps of the method for preventing disclosure of the protected information and the steps of the method of marking protected information are affected by instructions in software that are carried out by the computer. This software in one form is implemented as one or more entities and in another form as a security manager.

The software may be stored in a computer readable medium, comprising the storage devices described below, for example. The software is loaded into the computer from the computer readable medium, and then executed by the computer.

The computer system 900 consists of the computer 902, a video display 916, and input devices 918, 920. In addition, the computer system 900 can have any of a number of other output devices comprising line printers, laser printers, plotters, and other reproduction devices connected to the computer 902. The computer system 900 can be connected to one or more other computers via a communication interface 908c using an appropriate communication channel 930 such as a modem communications path, a computer network, or the like. The computer network may comprise a local area network (LAN), a wide area network (WAN), an Intranet, and/or the Internet.

The computer 902 itself consists of a central processing unit(s) (simply referred to as a processor hereinafter) 904, a memory 906 which may comprise random access memory (RAM) and read-only memory (ROM), input/output (I/O) interfaces 908a, 908b & 908c, a video interface 910, and one or more storage devices generally represented by a block 912 in FIG. 9. The storage device(s) 912 can comprise one or more of the following: a floppy disc, a hard disc drive, a magneto-optical disc drive, CD-ROM, magnetic tape or any other of a number of non-volatile storage devices well known to those skilled in the art. Each of the components 904 to 912 is typically connected to one or more of the other devices via a bus 914 that in turn can comprise data, address, and control buses.

The video interface 910 is connected to the video display 916 and provides video signals from the computer 902 for display on the video display 916. User input to operate the computer 902 can be provided by one or more input devices 908b. For example, an operator can use the keyboard 918 and/or a pointing device such as the mouse 920 to provide input to the computer 902.

The system 900 is simply provided for illustrative purposes and other configurations can be employed without departing from the scope and spirit of the invention. Exemplary computers on which the embodiment can be practiced comprise IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 912 in FIG. 9) as the computer readable medium, and read and controlled using the processor 904. Intermediate storage of the program and pixel data and any data fetched from the network may be accomplished using the semiconductor memory 906, possibly in concert with the hard disk drive 912.

In some instances, the program may be supplied to the user encoded on a CD-ROM or a floppy disk (both generally depicted by block 912), or alternatively could be read by the user from the network via a modem device connected to the computer, for example. Still further, the software can also be loaded into the computer system 900 from other computer readable medium comprising magnetic tape, a ROM or integrated circuit, a magneto-optical disk, a radio or infrared transmission channel between the computer and another device, a computer readable card such as a PCMCIA card, and the Internet and Intranets comprising email transmissions and information recorded on websites and the like.

The foregoing are merely exemplary of relevant computer readable mediums. Other computer readable mediums may be practiced without departing from the scope and spirit of the invention.

I claim:

1. A method of preventing disclosure of protected information in a platform, wherein the platform comprises a plurality of entities and a security manager, said method comprises the steps of:

requesting an unsafe operation of a trusted first entity by a second entity, each entity having data indicating whether the entity is trusted or untrusted and whether the entity has or has not been exposed to the protected information;

notifying the security manager of the requested operation; and halting the requested operation of the trusted first entity, if the second entity is untrusted and contains protected information or has been exposed to protected information.

2. A method according to claim 1, wherein said method further comprises the step of:
notifying the second entity that the requested operation was not performed.

3. A method according to claim 1,
wherein the trusted first entity is an active entity and said requesting step includes directly requesting, by the untrusted second entity, the unsafe operation of the trusted first entity; and
wherein said notifying step includes notifying, by the trusted first entity, the security manager of the request.

4. A method according to claim 1, wherein the trusted first entity is a passive entity and said requesting step includes requesting, by the untrusted second entity, permission from the security manager to allow the unsafe operation from the trusted first entity.

5. A method according to claim 1, wherein the platform is a general purpose computer.

6. A method according to claim 1, wherein the platform is a domestic appliance.

7. A method according to claim 1, wherein the platform is an industrial appliance.

8. A method according to claim 1, wherein the platform is a service appliance.

9. A method according to claim 1, wherein the platform is a network of computers.

10. A method of marking an entity as having been exposed to protected information in a platform, wherein the platform comprises a plurality of entities, said method comprises the steps of:
requesting information from a first entity by an untrusted second entity, each entity having data indicating whether the entity is trusted or untrusted and whether the entity has or has not been exposed to the protected information;
marking the data of the untrusted second entity to indicate that the untrusted second entity has been exposed, if the first entity contains protected information or has been exposed to protected information; and
supplying the requested information from the first entity to the untrusted second entity.

11. A method according to claim 10, wherein the platform comprises a security manager and said requesting step includes the sub-steps of:
notifying the security manager of the request; and
requesting the information from the first entity by the untrusted second entity.

12. A method according to claim 10, where said marking step includes the sub-steps of:
halting the operation of the untrusted second entity;
marking the data of the untrusted second entity to indicate that the untrusted second entity has been exposed, if the first entity contains protected information or has been exposed to protected information; and
notifying the untrusted second entity to resume operation.

13. A method according to claim 10, wherein the platform is a general purpose computer.

14. A method according to claim 10, wherein the platform is a domestic appliance.

15. A method according to claim 10, wherein the platform is an industrial appliance.

16. A method according to claim 10, wherein the platform is a service appliance.

17. A method according to claim 10, wherein the platform is a network of computers.

18. An apparatus for preventing disclosure of protected information in a platform, wherein the platform comprises a plurality of entities and a security manager, said apparatus comprises:
request means for requesting an unsafe operation of a trusted first entity by a second entity, each entity having data indicating whether the entity is trusted or untrusted and whether the entity has or has not been exposed to the protected information;
first notification means for notifying the security manager of the requested operation; and
halting means for halting the requested operation of the trusted first entity, if the second entity is untrusted and contains protected information or has been exposed to protected information.

19. An apparatus according to claim 18, wherein the apparatus further comprises second notification means for notifying the untrusted second entity that the requested operation was not performed.

20. An apparatus according to claim 18, wherein:
the trusted first entity is an active entity,
the request means comprises means for directly requesting, by the untrusted second entity, the unsafe operation from the trusted first entity, and
the first notification means comprises means for notifying, by the trusted first entity, the security manager of the request.

21. An apparatus according to claim 18, wherein the trusted first entity is a passive entity and the request means comprises means for requesting, by the untrusted second entity, permission from the security manager to allow the unsafe operation from the trusted first entity.

22. An apparatus according to claim 18, wherein the platform is a general purpose computer.

23. An apparatus according to claim 18, wherein the platform is a domestic appliance.

24. An apparatus according to claim 18, wherein the platform is an industrial appliance.

25. An apparatus according to claim 18, wherein platform is a service appliance.

26. An apparatus according to claim 18, wherein the platform is a network of computers.

27. An apparatus for marking an entity as having been exposed to protected information in a platform, wherein the platform comprises a plurality of entities, said apparatus comprises:
request means for requesting information from a first entity by an untrusted second entity, each entity having data indicating whether the entity is trusted or untrusted and whether the entity has or has not been exposed to the protected information;
marking means for marking the data of the untrusted second entity to indicate that the untrusted second entity has been exposed, if the first entity contains protected information or has been exposed to protected information; and
supply means for supplying the requested information from the first entity to the untrusted second entity.

28. An apparatus according to claim 27, wherein the platform comprises a security manager and said request means comprises:

means for notifying the security manager of the request; and means for requesting the information from the first entity by the untrusted second entity, wherein if the first entity contains protected information or has been exposed to protected information then performing the operations of the marking and supply means.

29. An apparatus according to claim 27, where said marking means comprises:

means for halting the operation of the untrusted second entity;

means for marking the data of the untrusted second entity to indicate that the untrusted second entity has been exposed; and means for notifying the untrusted second entity to resume operation.

30. An apparatus according to claim 27, wherein the platform is a general purpose computer.

31. An apparatus according to claim 27, wherein the platform is a domestic appliance.

32. An apparatus according to claim 27, wherein the platform is an industrial appliance.

33. An apparatus according to claim 27, wherein the platform is a service appliance.

34. An apparatus according to claim 27, wherein the platform is a network of computers.

35. A computer readable medium storing a computer program for preventing disclosure of protected information, said computer program comprises:

code for a first entity to request an unsafe operation from a trusted second entity, wherein the first and second entities each have data indicating whether the entity is trusted or untrusted and whether the first and second entities have or have not been exposed to the protected information;

code for notifying a security manager of the requested operation; and code for halting the requested operation of the trusted second entity, if the first entity is untrusted and contains protected information or has been exposed to protected information.

36. A computer readable medium storing a computer program for preventing disclosure of protected information, wherein said computer program comprises code for a security manager comprising the steps of:

receiving a request by an untrusted first entity to perform an unsafe operation from a trusted second entity, wherein the first and second entities have data indicating whether the entity is trusted or untrusted and whether the entity has or has not been exposed to the protected information; and notifying the first entity that the request is refused, if the first entity is untrusted and contains protected information or has been exposed to protected information.

37. A computer readable medium storing a computer program for marking an entity as having been exposed to protected information, wherein said computer program comprises:

code for a first entity to request information from a second entity, wherein the first and second entities each have data indicating whether the entity is trusted or untrusted and whether the entity has or has not been exposed to the protected information;

code for marking the data of the first entity to indicate that the first entity has been exposed, if the second entity contains protected information or has been exposed to protected information; and code for receiving the requested information from the second entity.

38. A computer readable medium storing a computer program for marking an entity as having been exposed to protected information, wherein said computer program comprises code for a security manager comprising the steps of:

receiving requests by an untrusted first entity for information from a second entity, wherein the first and second entities each have data indicating whether the entity is trusted or untrusted and whether the entity has or has not been exposed to the protected information;

marking data of the first entity to indicate that the first entity has been exposed, if the second entity contains protected information or has been exposed to protected information; and permitting supply of the requested information from the second entity to the untrusted first entity.

39. A computer readable medium storing a computer program for marking an entity having been exposed to protected information, said program comprising code for a security manager comprising the steps of:

receiving requests by a first entity to write information to an untrusted second entity, wherein the first and second entities each have data indicating whether the entity is trusted or untrusted and whether the entity has or has not been exposed to the protected information;

marking data of the second entity to indicate that the second entity has been exposed, if the first entity contains protected information or has been exposed to protected information; and permitting supply of the requested information from the first entity to the second entity.

* * * * *

UNITED STATES PATENT AND TRADEMARK OFFICE
CERTIFICATE OF CORRECTION

| | | |
|---|---|---|
| PATENT NO. | : 6,871,277 B1 | Page 1 of 2 |
| APPLICATION NO. | : 09/422108 | |
| DATED | : March 22, 2005 | |
| INVENTOR(S) | : Seppo Reino Keronen | |

It is certified that error appears in the above-identified patent and that said Letters Patent is hereby corrected as shown below:

COLUMN 1:

Line 32, "document;" should read --document:--.

COLUMN 2:

Line 49, "or not" should read --or has not--; and
    Line 66, "or not" should read --or has not--.

COLUMN 3:

Line 8, "herein" should read --wherein--;
    Line 10, "or not" should read --or has not--;
    Line 11, "comprises" should read --comprises:--; and
    Line 49, "FIG. 5," should read --FIG. 5--.

COLUMN 5:

Line 16, "well defined" should read --well-defined--; and
    Line 27, "fields;" should read --fields:--.

COLUMN 8:

Line 1, modern should read --modem--; and
    Line 44, "modern" should read --modem--.

UNITED STATES PATENT AND TRADEMARK OFFICE
CERTIFICATE OF CORRECTION

| | | |
|---|---|---|
| PATENT NO. | : 6,871,277 B1 | |
| APPLICATION NO. | : 09/422108 | |
| DATED | : March 22, 2005 | |
| INVENTOR(S) | : Seppo Reino Keronen | |

It is certified that error appears in the above-identified patent and that said Letters Patent is hereby corrected as shown below:

<u>COLUMN 10</u>:

Line 44, "platform" should read --the platform--.

Signed and Sealed this

Seventh Day of August, 2007

JON W. DUDAS
*Director of the United States Patent and Trademark Office*